(No Model.)
H. W. MATTHEWS.
INSECT TRAP.
No. 552,644. Patented Jan. 7, 1896.
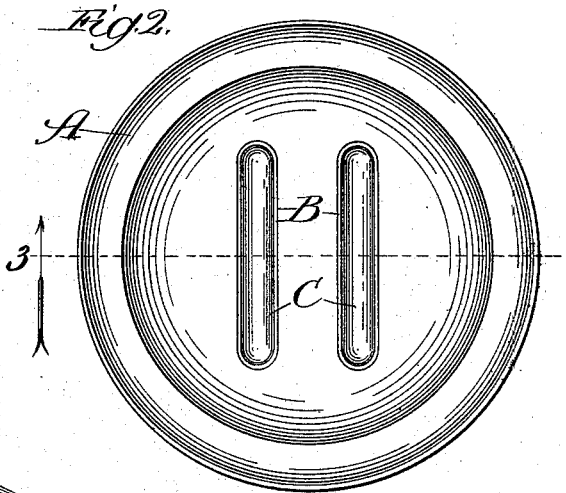
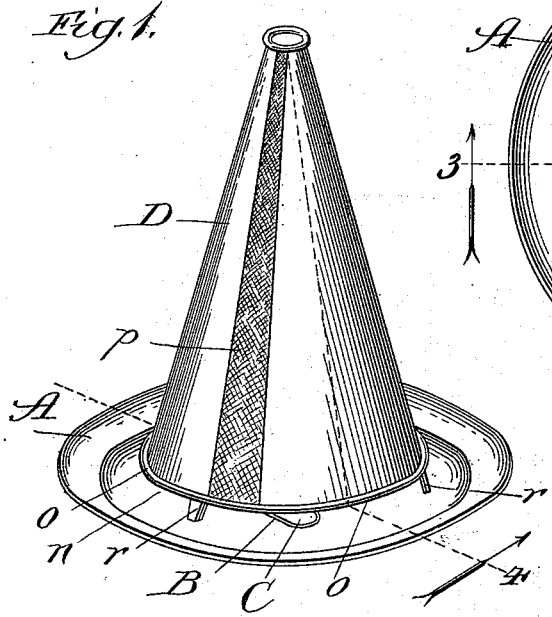
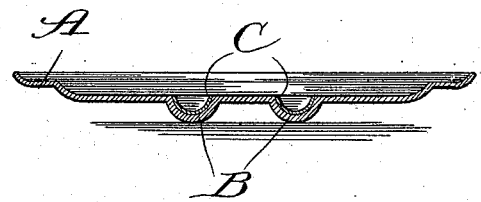
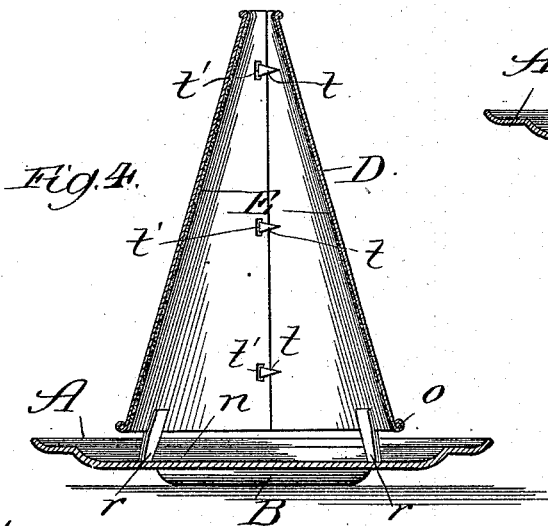
Witnesses:
Chas E Gaylord
Lute S Alter
Inventor:
Hugh W. Matthews,
By Dyrenforth & Dyrenforth,
Att'ys

UNITED STATES PATENT OFFICE.

HUGH W. MATTHEWS, OF CHICAGO, ILLINOIS.

INSECT-TRAP.

SPECIFICATION forming part of Letters Patent No. 552,644, dated January 7, 1896.

Application filed April 10, 1895. Serial No. 545,188. (No model.)

*To all whom it may concern:*

Be it known that I, HUGH W. MATTHEWS, a citizen of the United States, residing at Chicago, in the county of Cook and State of Illinois, have invented a new and useful Improvement in Insect-Traps, of which the following is a specification.

My invention relates to an improvement in the class of devices employed in rooms for destroying insects, and more particularly flies; and it involves, as an essential feature, the use of suitably-prepared poison, such as that found in the commonly-used poisonous fly-paper.

My primary object is, in providing effective means for destroying flies, to avoid the unsightly appearance presented by the ordinary poisonous fly-paper referred to, when employed for the purpose in the usual manner, which is to lay it in an open dish at any convenient place in the room, the dish affording a receptacle for water with which the fly-paper is required to be kept saturated. Most of the flies that are poisoned by drinking from this dish die before leaving it, and the accumulation of dead flies presents a disgusting sight, no means being provided for hiding them from view, while those which fly off after partaking of the poison and die elsewhere are liable to fall or otherwise get into food, dishes, and the like, and into conspicuous places.

By means of my improvement I provide for covering from view such of the flies as die before leaving the poison of which they have partaken, and I also provide means for intercepting and hiding from view those which fly off after having been so poisoned.

My invention is illustrated in the accompanying drawings, in which—

Figure 1 is a perspective view of my improved insect-trap; Fig. 2, a plan view of the plate; Fig. 3, a section taken at the line 3 on Fig. 2 and viewed in the direction of the arrow; and Fig. 4, a vertical section through the complete device, taken at the line 4 on Fig. 1 and viewed in the direction of the arrow.

A is a plate or dish-shaped body provided with one or more, and preferably two, depressions near its center, each affording a poison-well B for containing the insect-destroying poisonous material or paper C and the water for moistening it. The body A is best formed of paper by pressing it out of paper-pulp in a mold adapted to form, in the manufacture of the plate, the depressions affording the wells, in each of which I provide fly-poison or a poison-bait of a variety rendered attractive to flies in any suitable or well-known manner, the poison employed being preferably strips of the ordinary poisonous fly-paper cemented in the wells to poison water introduced into the latter to furnish flies with drink. The dish A is surmounted by an open-ended substantially tubular cover D of any suitable shape, but with the diameter of its base sufficient to compass the wells B when the cover is adjusted in place in a manner to leave a space $n$ between its lower edge and the upper surface of the dish A, which may be accomplished by providing legs $r$ to project at suitable intervals from the base of the cover, and which, to support it in erect position, are fastened, as by gluing, to the dish. I prefer to form the cover D in the conical shape illustrated and of adequately stiff paper, with a longitudinal insertion $p$ of some translucent material, as porous cloth, to admit light to the interior of the cover; and the cloth, when used, owing to its flexibility, requires, to prevent collapsion of the cover, that the latter be stiffened, as by providing it with a stiffening bead or wire $o$ about its lower edge. The interior surface of the cover is coated with a sticky substance E, which should be of a variety which will not readily be hardened by exposure; and the exterior surface of the cover affords desirable space for advertising purposes or for appropriate ornamentation, or both. For economy and convenience I prefer to form the conical cover D in two sections, one section being provided near an edge with a series of slots $t'$ to receive tongues $t$ cut in the adjacent edge portion of the opposite section and fastened by cementing in the slots. The insertion $p$ then joins the opposite edges of the two sections.

Flies gain access to the contents of the wells B through the space $n$, by which, also, the requisite water may be supplied to the wells. After drinking of the poisoned water the flies which die on the dish are hidden from view by the cover D. Those, or most of those, which fly away after being poisoned will ascend in the cover, wherein they come into contact with its sticky surface and are thus intercepted and remain covered by the trap after dying.

What I claim as new, and desire to secure by Letters Patent, is—

1. In a fly-trap, a plate provided with one or more wells for poison-bait, and a tubular cover surmounting the plate and encompassing said well or wells and affording at its base a space for access to said well or wells and provided with an inner-surface coating of sticky material, substantially as and for the purpose set forth.

2. In a fly-trap, the combination of a plate A having formed in it one or more wells B lined with poisonous material, and a conical cover D surmounting the plate and encompassing said well or wells and affording at its base a space for access to said poison-wells and provided with an inner-surface coating of sticky material, substantially as and for the purpose set forth.

3. In a fly-trap, the combination of a plate A having formed in it one or more wells B lined with poisonous material, and a conical cover D having at its base legs $r$ at which it is secured on the plate to afford a space $n$, said base encompassing the well or wells, and the cover being provided with an inner-surface coating E of sticky material, substantially as and for the purpose set forth.

4. A fly-trap comprising, in combination, a plate A having formed in it one or more wells B lined with poisonous material, and a conical cover D lined with a sticky substance and provided with a translucent insertion $p$ and provided at its base with legs $r$ at which it is secured to the plate to afford a space $n$, said base encompassing the well or wells, substantially as and for the purpose set forth.

HUGH W. MATTHEWS.

In presence of—
J. H. LEE,
M. J. FROST.